United States Patent
Wang

(10) Patent No.: US 7,793,133 B2
(45) Date of Patent: Sep. 7, 2010

(54) POWER MANAGEMENT METHOD AND SYSTEM BASED ON DATA UNIT RUNNING CYCLE AND PERFORMANCE REQUIREMENT

(75) Inventor: Ko-Fang Wang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 737 days.

(21) Appl. No.: 11/758,691

(22) Filed: Jun. 6, 2007

(65) Prior Publication Data
US 2008/0086653 A1    Apr. 10, 2008

(30) Foreign Application Priority Data
Oct. 4, 2006    (TW) ............................... 95136855 A

(51) Int. Cl.
| G06F 1/00 | (2006.01) |
| G06F 1/26 | (2006.01) |
| G06F 15/00 | (2006.01) |
| G06F 17/00 | (2006.01) |
| G06F 15/16 | (2006.01) |
| H04L 12/28 | (2006.01) |
| H04J 3/16 | (2006.01) |
| H04J 3/06 | (2006.01) |
| H03K 17/00 | (2006.01) |

(52) U.S. Cl. .................. 713/500; 713/320; 713/322; 712/2; 712/28; 712/36; 700/94; 370/351; 370/470; 370/509; 345/502; 327/365

(58) Field of Classification Search ................. 713/320, 713/322, 500; 712/2, 28, 36; 700/94; 327/365; 345/502; 370/351, 470, 509
See application file for complete search history.

(56) References Cited

U.S. PATENT DOCUMENTS

| 5,583,979 | A  | * | 12/1996 | Sonohara et al. ............. 345/473 |
| 5,815,725 | A  |   | 9/1998  | Feierbach |
| 7,051,227 | B2 | * | 5/2006  | Kazachinsky et al. ........ 713/500 |
| 7,069,463 | B2 | * | 6/2006  | Oh .............................. 713/503 |
| 2002/0130870 | A1 | * | 9/2002 | Ebihara ....................... 345/440 |
| 2006/0136764 | A1 | * | 6/2006 | Munguia ...................... 713/322 |

* cited by examiner

*Primary Examiner*—Stefan Stoynov
(74) *Attorney, Agent, or Firm*—Thomas, Kayden, Horstemeyer & Risley

(57) ABSTRACT

Power management methods and systems. First, a running cycle of a processing unit processing a data unit is recorded. A gating signal is generated according to the running cycle and a performance requirement, and a working clock is adjusted according to the gating signal. Thereafter, the adjusted working signal is provided to the processing unit.

18 Claims, 9 Drawing Sheets

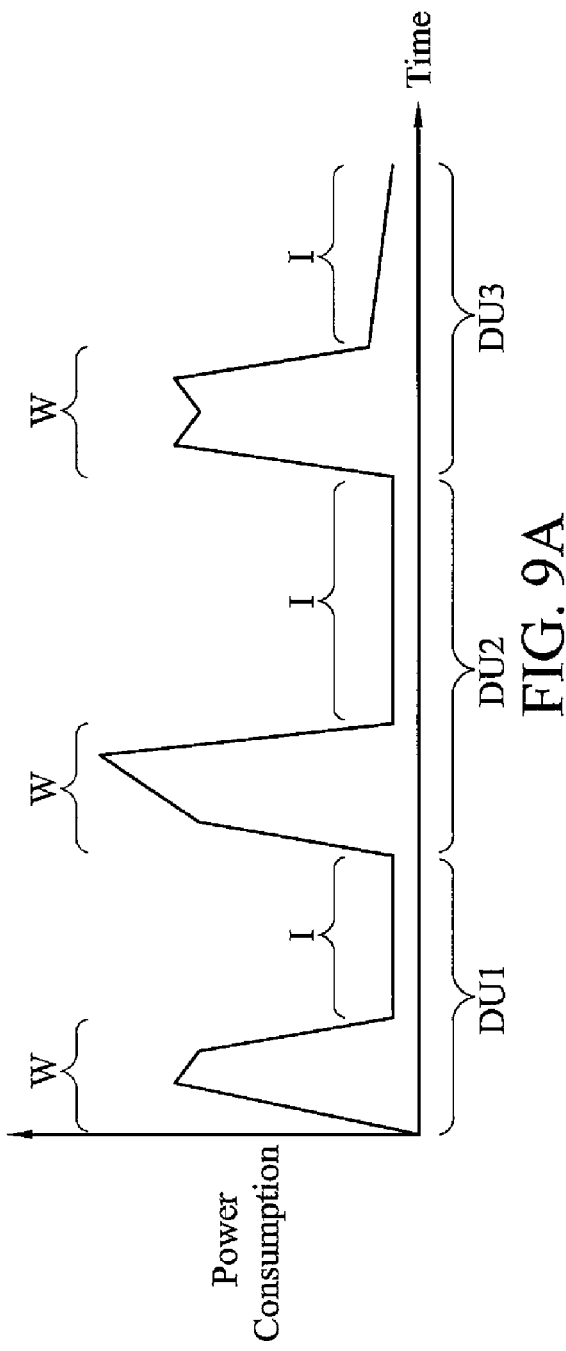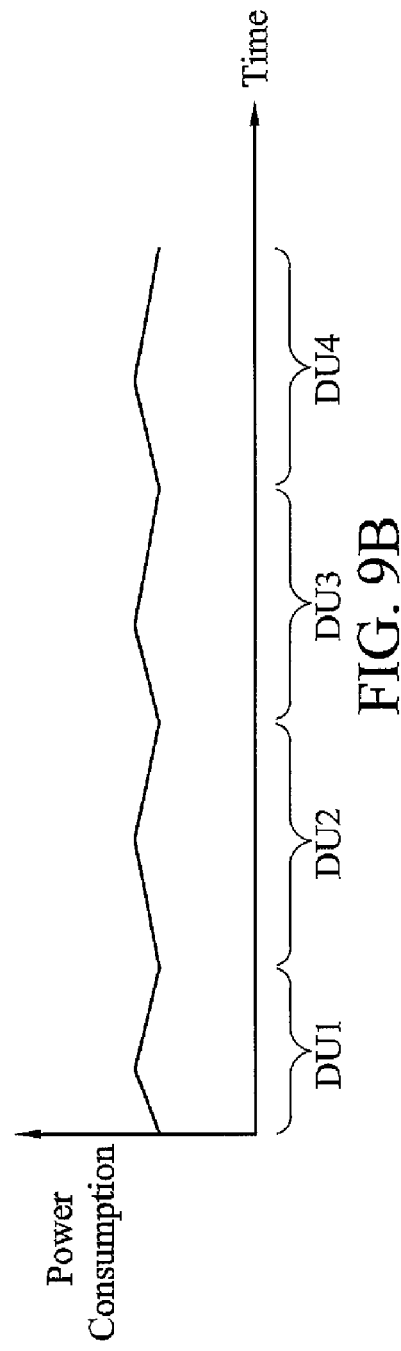
FIG. 9A
FIG. 9B

POWER MANAGEMENT METHOD AND SYSTEM BASED ON DATA UNIT RUNNING CYCLE AND PERFORMANCE REQUIREMENT

BACKGROUND OF THE INVENTION

1. Field of the Invention

The disclosure relates generally to power management methods and systems, and, more particularly to methods and systems that dynamically adjust a working clock of a media processor according to a running cycle required for executing a data unit.

2. Description of the Related Art

With growing demands for performance, quality and functionality, designs for processors such as media processors have increasingly become large and complicated, with function thereon easily failing due to deficiency of power design. Consequently, improvement of power consumption efficiency has become a key factor in processor design.

Power management is very important in media systems. FIG. 1 illustrates a conventional media system 100, comprising a main processor 110, a media processor 120, a memory 130, an input/output unit 140 and a display unit 150. The media processor 120 performs related video operations, such as encoding and decoding, 2D and 3D animation, MP3 decoding, and others. To smoothly play back video via the input/output unit 140 and the display unit 150, the media processor 120 must prepare sufficient video signals. The media processor 120 performs a large number of tasks at some times, and few tasks other times. The imbalance is due to the performance requirements of the media system 100, such as frame rate maintenance and image complexity. Power consumption relates to working voltage and frequency supplied to the media processor 120. If voltage and frequency are higher, the media processor 120 consumes more power. Conversely, if voltage and frequency are lower, the media processor 120 consumes less power.

In conventional power management, the main processor 110 monitors conditions such as system temperature and/or remaining battery power of the media system 100 to adjust working voltage and frequency accordingly, and supplies the adjusted working voltage and frequency to the media processor 120 for power management. Further, due to the operational imbalance described, power requirements differ for respective periods. Since the main processor 110 must expend resources to periodically monitor media system 100, including the overall function of the media processor 120 for related adjustments, the main processor 110 may be overloaded.

Additionally, conventional power management cannot perform related power adjustment and management for the difference between execution situation and performance requirement, resulting in instability of power consumption when media processor 120 is processing video data. In some situations, sudden high current in some periods may generate unexpected calorific capacity, damaging and shortening the life cycle of the media system 100.

BRIEF SUMMARY OF THE INVENTION

Power management methods and systems are provided.

In an embodiment of a power management method for use in a media system is disclosed. First, a running cycle of a processing unit processing a data unit is recorded. Then, a gating signal is generated according to the running cycle and a performance requirement, and a working clock is adjusted according to the gating signal. Thereafter, the adjusted working signal is provided to the processing unit.

An embodiment of a power management system comprises a processing unit, a counter, a control unit and a composition unit. The processing unit processes a data unit. The counter records a running cycle of the processing unit processing the data unit. The control unit receives the running cycle and a performance requirement, and generates a gating signal according to the running cycle and the performance requirement. The composition unit receives the gating signal and a working clock, adjusts the working clock according to the gating signal, and provides the adjusted working signal to the processing unit.

Power management methods and systems may take the form of program code embodied in a tangible media. When the program code is loaded into and executed by a machine, the device becomes an apparatus for practicing the disclosed method.

BRIEF DESCRIPTION OF THE DRAWINGS

The invention will become more fully understood by referring to the following detailed description with reference to the accompanying drawings, wherein:

FIGS. 9A and 9B are schematic diagrams illustrating power consumption for processing a plurality of data units (frames, for instance) in a conventional method and in the invention, respectively.

DETAILED DESCRIPTION OF THE INVENTION

Power management methods and systems are provided.

Figure 1:
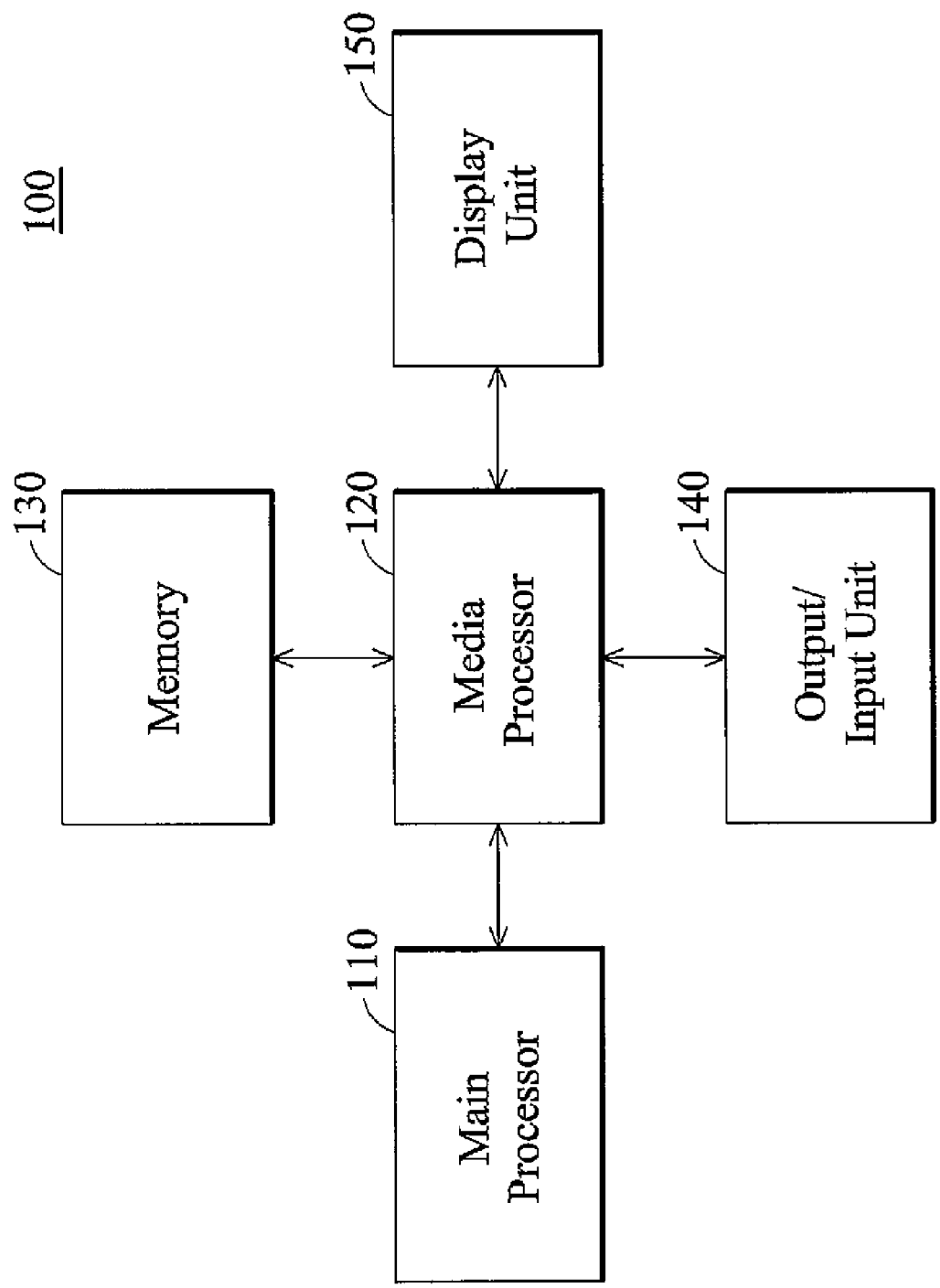
FIG. 1 is a schematic diagram illustrating a conventional media system.
Figure 2:
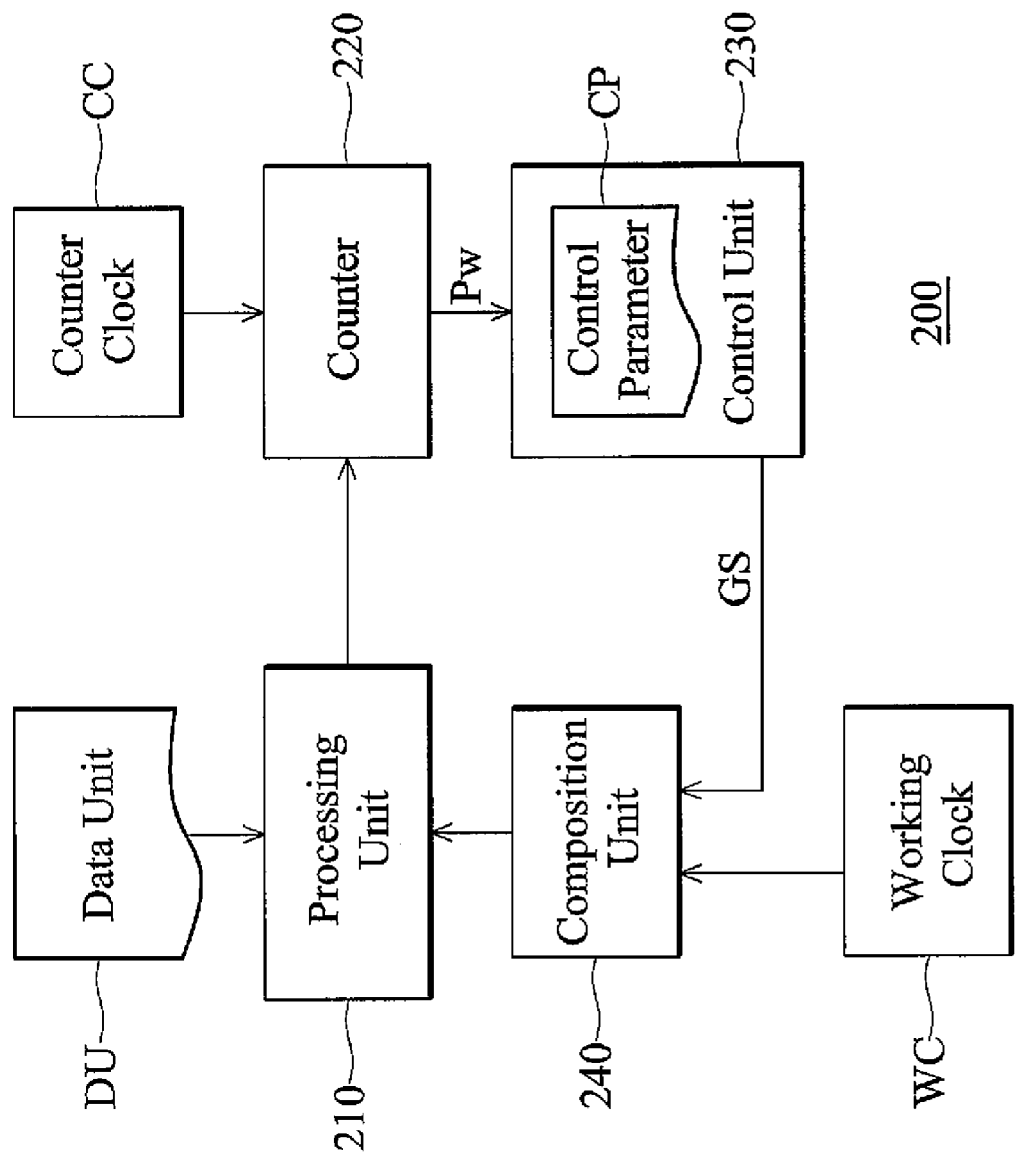
FIG. 2 is a schematic diagram illustrating an embodiment of a power management system.

FIG. 2 is a schematic diagram illustrating an embodiment of a power management system. The power management system may be applied in a media system such as an integrated graphic chip, where graphic function and Southbridge and Northbridge chips are integrated into a single chip, or a non-integrated standalone graphic chip. The media system may be employed for video process, such as video encoding and decoding, 2D and 3D animation, MP3 decoding, and others.

As shown in FIG. 2, the power management system 200 comprises a processing unit 210, a counter 220, a control unit 230 and a composition unit 240. The processing unit 210 performs related operations on media data, such as video encoding and decoding, 2D and 3D animation, MP3 decoding, and others. The processing unit 210 receives and processes media data comprising a plurality of data units such as frames. When a frame is processed, the processing unit 210 executes the commands corresponding to the frame. Note that the processing unit 210 receives a working clock WC via the composition unit 240, and operates based on the working clock WC.

Figure 3:
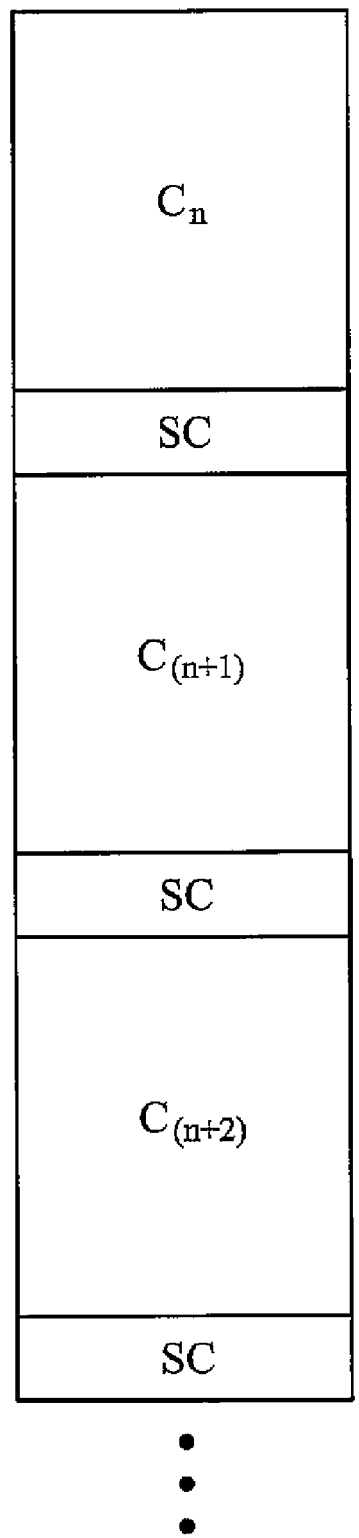
FIG. 3 is a schematic diagram illustrating commands corresponding to respective frames and preset commands therebetween.

The counter 220 records a running cycle Pw of the processing unit 210 processing a frame based on a counter clock CC. It is understood that the counter clock CC and the working clock WC are independent and mutually non-interfering, such that the accuracy of the counter can be ensured. In some embodiments, since the frames in the media data are successive, a specific preset command is employed between commands corresponding to different frames, as shown in FIG. 3. In FIG. 3, Cn represents commands corresponding to frame n, C(n+1) represents commands corresponding to frame n+1, and C(n+2) represents commands corresponding to frame n+2. A preset command SC is employed between commands corresponding to different frames, wherein the preset command SC may be a flag command. When the processing unit 210 receives and executes a command corresponding to a new frame, the processing unit 210 directs the counter 220 to initiate counting of running cycle Pw. If the processing unit 210 receives the preset command SC, the processing unit 210 directs the counter 220 to stop counting the running cycle and reset the running cycle.

The control unit 230 has a control parameter CP comprising a performance requirement Pt. In some embodiments, the control parameter CP further comprises a preset maximum value Pmax, a preset minimum value Pmin, and an adjustment value Pd. The control unit 230 generates a gating signal GS according to the running cycle of the processing unit 210 processing a data unit and the preset control parameter CP, and outputs the gating signal GS to the composition unit 240. Note that the control parameter CP can be defined and set by a driver. The use of the control parameter CP is discussed later. The composition unit 240 receives the working clock WC and the gating signal GS, adjusts the working clock WC according to the gating signal GS, and outputs the adjusted working clock WC to the processing unit 210. The composition unit 240 may be an AND gate, executing an AND logic operation to the working clock WC and the gating signal GS to compose the working clock WC and the gating signal GS.

Figure 8A:
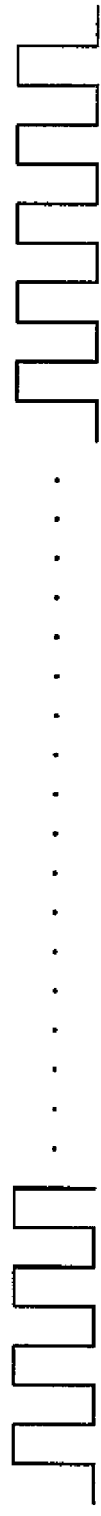
FIG. 8A is a time chart showing a working clock.
Figure 8B:
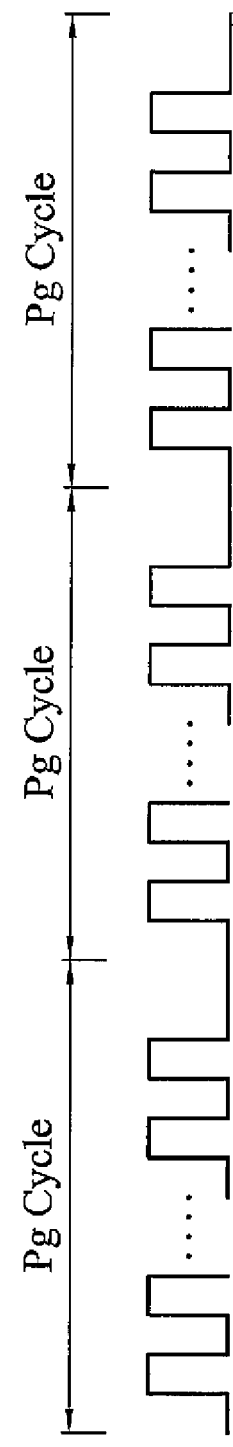
FIG. 8B is a time chart showing a working clock combined with a gating signal with cycle length Pg.
Figure 8C:
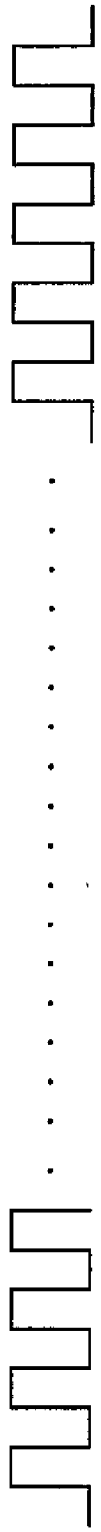
FIG. 8C is a time chart showing a working clock combined with a gating signal with cycle length Pg, where Pg=0.

It is understood that the gating signal GS comprises a cycle length Pg, and gates a cycle to the working clock WC every other cycle length Pg via the composition unit 240. In other words, based on clock gating technique, the working clock WC can be adjusted using gating signals of various cycle lengths, generated according to different running cycle Pw and control parameter CP. In some embodiments, the cycle length Pg of a gating signal GS falls within the maximum value Pmax and the minimum value Pmin. If the cycle length Pg is reduced, it slows the working clock. If the cycle length Pg is 0, the working clock WC is maintained as original. For example, FIG. 8A shows an original working clock WC. The composition unit 240 composes the working clock WC and the gating signal GS with a cycle length Pg to generate an adjusted working clock, as shown in FIG. 8B, where a cycle of the working clock WC is gated every other cycle length Pg. If the cycle length Pg of the gating signal GS is 0, the working clock WC will not be gated, as shown in FIG. 8C. Further, if the cycle length Pg is increased, it accelerates the working clock WC.

Figure 4:
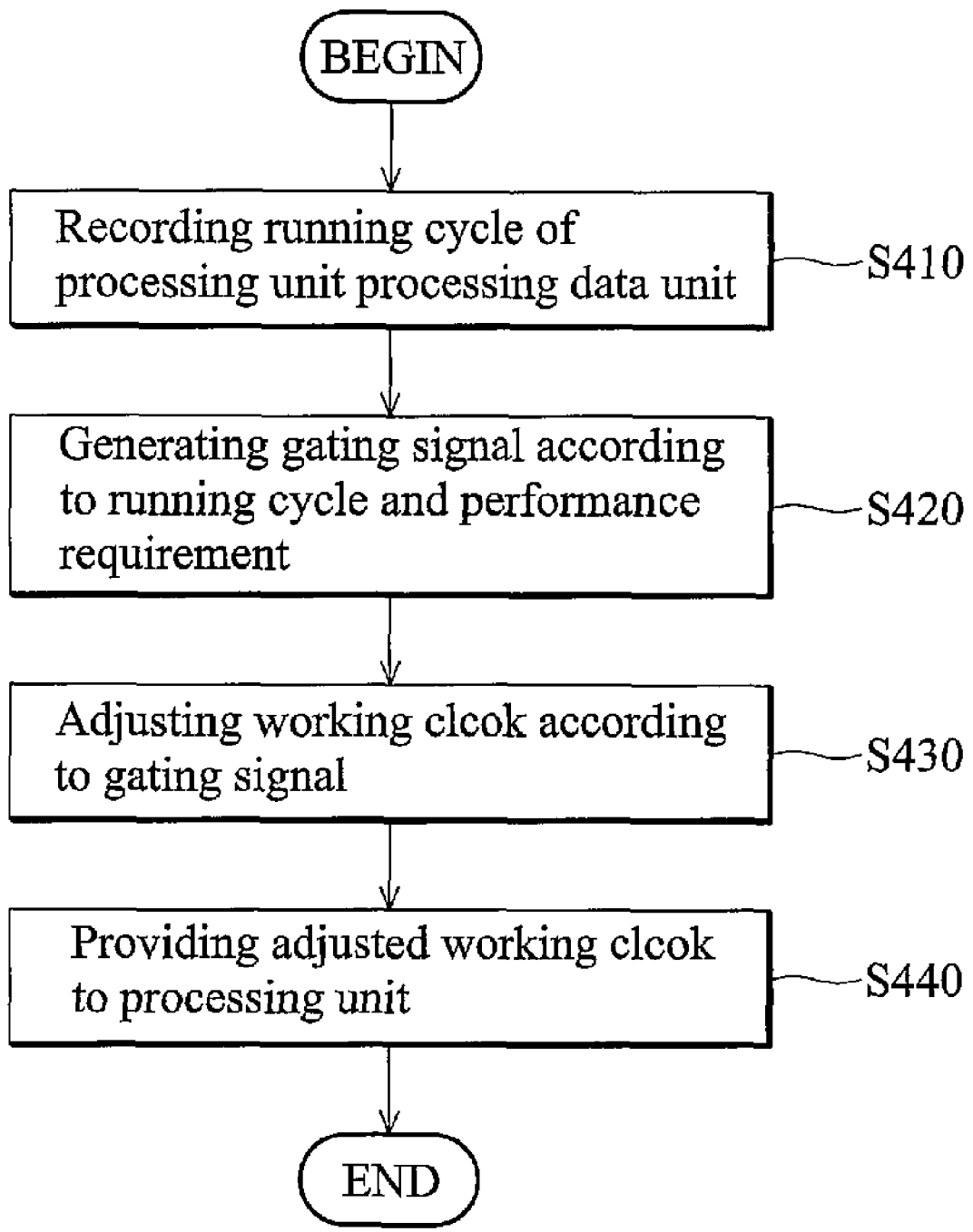
FIG. 4 is a flowchart of an embodiment of a power management method.

FIG. 4 is a flowchart of an embodiment of a power management method.

Figure 5:
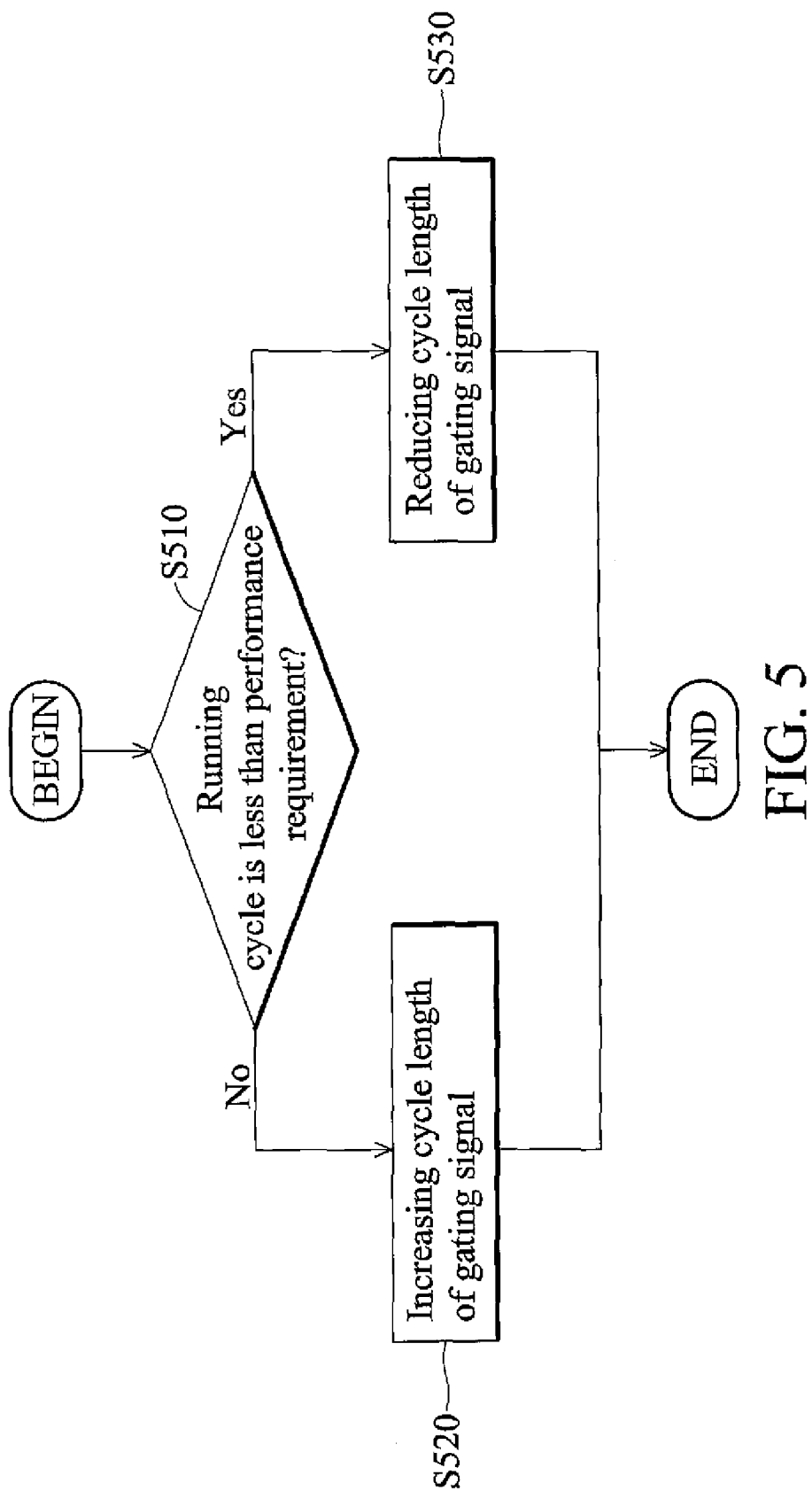
FIG. 5 is a flowchart of an embodiment of a method for gating signal generation.

In step S410, a running cycle Pw of a processing unit processing a data unit such as frame is recorded. In some embodiments, the processing unit executes a plurality of commands corresponding to the frame in the running cycle. When the processing unit receives and executes the first command corresponding to the frame, the running cycle begins to count. If the processing unit receives a preset command SC, the counting of the running cycle is stopped. In step S420, a gating signal is generated according to the running cycle Pw and a performance requirement Pt. FIG. 5 is a flowchart of an embodiment of a method for gating signal generation. In step S510, it is determined whether the running cycle Pw is less than the performance requirement Pt. If so, the process speed of the processing unit is excessive, and in step S530, a gating signal is generated, and the cycle length Pg is reduced from a specific length, thus increasing the gating frequency to slow the working clock. If not, the process speed of the processing unit is low, and in step S520, a gating signal is generated, and the cycle length Pg is increased from the specific length, thus reducing the gating frequency to accelerate the working clock. In step S430, a working clock is adjusted according to the gating signal, and in step S440, the adjusted working signal is provided to the processing unit. The processing unit operates based on the adjusted working clock.

Figure 6:
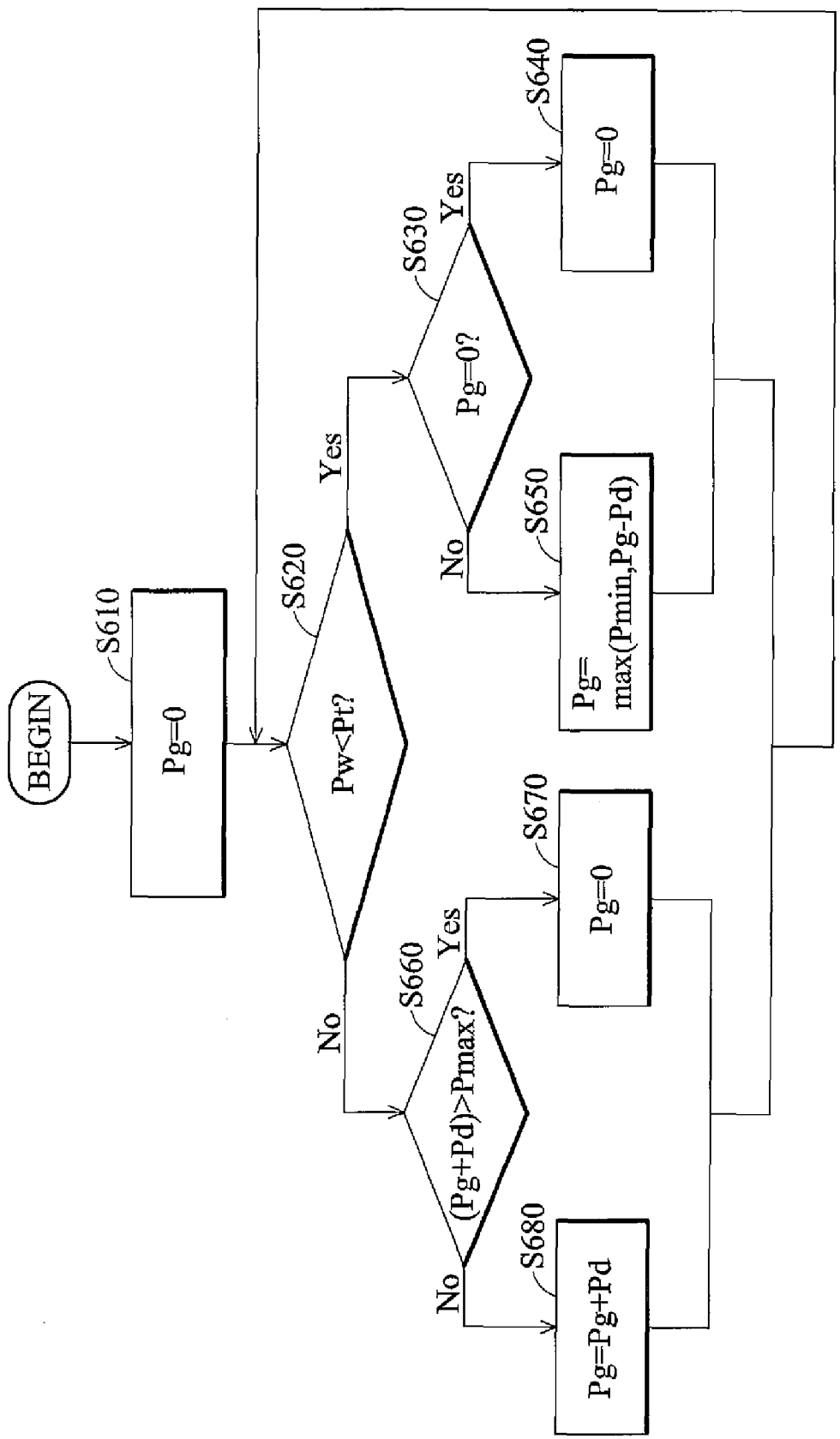
FIG. 6 is a flowchart of an embodiment of an example for setting cycle length of gating signal.

FIG. 6 is a flowchart of an embodiment of an example for setting cycle length of gating signal. In step S610, the cycle length Pg of a gating signal is initially set as 0. After the processing unit has processed a data unit, in step S620, it is determined whether the running cycle Pw is less than the performance requirement Pt. If so, the process speed of the processing unit is excessive, and in step S630, it is determined whether the current cycle length Pg equals 0. If so, in step S640, the cycle length Pg is maintained at 0. Note that since the Pg equals 0, representing that the processing unit is operating at maximum speed, and cannot be further accelerated, the cycle length Pg is maintained at 0 in step S640. If Pg does not equal 0, in step S650, the cycle length Pg is set as the greatest value among the preset minimum value and Pg−Pd (Pg=max(Pmin, Pg−Pd)), where Pd is a preset adjustment value, representing a delta value to be adjusted in each adjustment. It is understood that, since the working clock is not gated if Pg equals 0, and the operation of the processing unit may become too slow if the cycle length becomes too short, resulting in abnormal operation, the cycle length Pg is set as the greatest value among the preset minimum value Pmin and Pg−Pd in step S650, thus maintaining normal operation of the processing unit. If the running cycle Pw is not less than the performance requirement Pt, the process speed of the processing unit is low, and in step S660, it is determined whether the cycle length Pg added the adjustment value Pd exceeds the preset maximum value Pmax. If so, the operation of the processing unit is too slow in processing the data unit, in step S670, the cycle length Pg is set as 0. If not, in step S680, Pd is added to the cycle length. Once the cycle length Pg increases, the operation of the processing unit becomes faster. Thereafter, the procedure returns to step S620, and continues to the determination between the running cycle Pw and the performance requirement Pt for next data unit, and adjustment on the cycle length Pg of gating signal.

Figure 7:
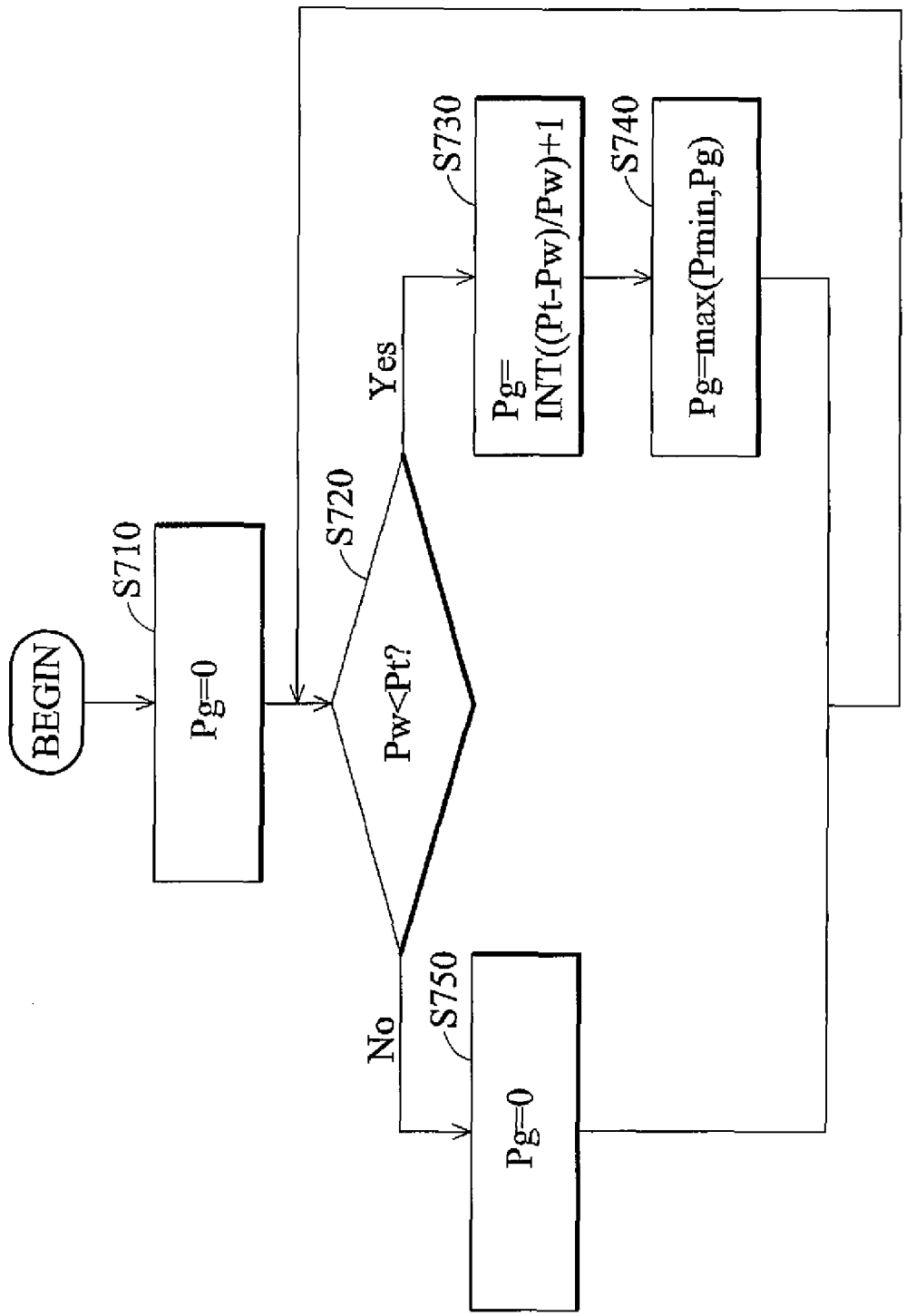
FIG. 7 is a flowchart of another embodiment of an example for setting cycle length of gating signal.

FIG. 7 is a flowchart of another embodiment of an example for setting cycle length of gating signal. In step S710, the cycle length Pg of a gating signal is initially set as 0. After the processing unit has processed a data unit, in step S720, it is determined whether the running cycle Pw is less than the performance requirement Pt. If so, in step S730, the cycle length Pg is set as INT((Pt−Pw)/Pw)+1, and in step S740, the cycle length Pg is set as the greatest value among the preset minimum value Pmin and Pg (Pg=max(Pmin, Pg)). It is understood that in step S730, the cycle length Pg can be set according to the excess portion between the performance requirement Pt and the running cycle Pw. Similarly, since the working clock is not gated if Pg equals 0, and the operation of the processing unit may become too slow if the cycle length becomes too short, resulting in abnormal operation, the cycle length Pg is set as the greatest value among the preset minimum value Pmin and Pg in step S740, thus maintaining normal operation of the processing unit. If the running cycle Pw is not less than the performance requirement Pt, in step S750, the cycle length Pg is set as 0. Thereafter, the procedure returns to step S720, and continues to the determination between the running cycle Pw and the performance requirement Pt for next data unit, and adjustment on the cycle length Pg of gating signal.

As shown in FIGS. 5, 6 and 7, if the running cycle Pw equals the performance requirement Pt, no adjustment is required since the processing unit is operating in an optimal situation, and is not discussed here.

FIGS. 9A and 9B are schematic diagrams illustrating power consumption for processing a plurality of data units (frames, for instance) in a conventional method and the invention, respectively. In FIG. 9A, time spent processing respective data units equals the sum of working time W and idle time I. Although no power is consumed during idle time, however, a peak current is generated due to the power consumption during working times, generating unexpected calorific capacity, thus damaging and shortening the life cycle of media system, since conventional power management cannot perform related power adjustment and management for the difference between the execution situation and performance requirement, thus resulting in unbalance situation on power consumption during video processing. The invention evaluates the running cycle of the media system. If the operation of processing unit is excessive, the operation is slowed. Otherwise, the operation is sped up. In this way, the power consumption will be more stable in time axis, thus avoiding damage to the media system due to unexpected calorific capacity.

Power management methods and systems, or certain aspects or portions thereof, may take the form of program code (i.e., executable instructions) embodied in tangible media, such as floppy diskettes, CD-ROMS, hard disks, or any other machine-readable storage medium, wherein, when the program code is loaded into and executed by a machine, such as a computer, the device thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the device becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A power management method for use in a media system comprising a processing unit, the method comprising:
   recording a running cycle of the processing unit processing a data unit;
   generating a gating signal according to the running cycle and a performance requirement, wherein the gating signal comprises a cycle length, and the gating signal gates a cycle to a working clock every other cycle length;
   adjusting the working clock according to the gating signal to generate an adjusted working clock;
   providing the adjusted working clock to the processing unit,
   wherein the processing unit processes another data unit based on the adjusted working clock;
   comparing the running cycle with the performance requirement;
   if the running cycle is less than the performance requirement, generating the gating signal, and reducing the cycle length from a specific length, slowing the working clock; and
   if the running cycle exceeds the performance requirement, generating the gating signal, and increasing the cycle length from the specific length, accelerating the working clock.

2. The power management method of claim 1 wherein the data unit comprises a frame in media data, and the processing unit executes at least one command corresponding to the frame within the running cycle.

3. The power management method of claim 2 further comprising:
   counting the running cycle if the command corresponding to the frame is received and executed by the processing unit; and
   stopping counting the running cycle if a preset command is received.

4. The power management method of claim 1 further comprising performing an AND logic operation to the gating signal and the working clock to generate the adjusted working clock.

5. The power management method of claim 1 further comprising:
   comparing the running cycle with the performance requirement;
   if the running cycle is less than the performance requirement, determining whether the cycle length of the gating signal equals 0, if so, maintaining the cycle length at 0, and if not, reducing the cycle length by an adjustment value; and
   if the running cycle exceeds the performance requirement, determining whether the cycle length after addition of the adjustment value exceeds a preset maximum value, if so, setting the cycle length as 0, and if not, adding the cycle length with the adjustment value.

6. The power management method of claim 5, further comprising, if the cycle length is not 0:
   determining whether the cycle length reduced by the adjustment value is less than a preset minimum value;
   if so, setting the cycle length as the preset minimum value; and
   if not, reducing the cycle length with the adjustment value.

7. The power management method of claim 1 further comprising:
   comparing the running cycle with the performance requirement;
   if the running cycle is less than the performance requirement, setting the cycle length according to a formula $Pg=INT((Pt-Pw)/Pw)+1$, where Pg is the cycle length, Pt is the performance requirement, and Pw is the running cycle; and if the running cycle exceeds the performance requirement, setting the cycle length as 0.

8. The power management method of claim 7 further comprising:
    determining whether the cycle length set according to the formula is less than a preset minimum value;
    if so, setting the cycle length as the preset minimum value; and
    if not, setting the cycle length according to the formula.

9. The power management method of claim 1 further comprising recording the running cycle according to a counter clock, where the counter clock and the working clock are independent and mutually non-interfering.

10. A power management system for use in a media system, comprising:
    a processing unit processing a data unit;
    a counter recording a running cycle of the processing unit processing the data unit;
    a control unit receiving the running cycle and a performance requirement, and generating a gating signal accordingly, wherein the gating signal comprises a cycle length, and the gating signal gates a cycle to a working clock every other cycle length, and wherein the control unit further compares the running cycle with the performance requirement, and, if the running cycle is less than the performance requirement, generates the gating signal, and reduces the cycle length from a specific length, slowing the working clock, and if the running cycle exceeds the performance requirement, generates the gating signal, and increases the cycle length from the specific length, accelerating the working clock; and
    a composition unit receiving the gating signal and the working clock, adjusting the working clock according to the gating signal, and providing the adjusted working clock to the processing unit,
    wherein the processing unit processes another data unit based on the adjusted working clock.

11. The power management system of claim 10 wherein the data unit comprises a frame in media data, and the processing unit executes at least one command corresponding to the frame within the running cycle.

12. The power management system of claim 11 wherein the processing unit further receives and executes the command corresponding to the frame, and directs the counter to count the running cycle, and the processing unit directs the counter to stop counting the running cycle if a preset command is received.

13. The power management system of claim 10 wherein the composition unit further performs an AND logic operation to the gating signal and the working clock to generate the adjusted working clock.

14. The power management system of claim 10 wherein the control unit further compares the running cycle with the performance requirement, and, if the running cycle is less than the performance requirement, determines whether the cycle length of the gating signal equals 0, and if so, maintains the cycle length at 0, and if not, reduces the cycle length by an adjustment value, and if the running cycle exceeds the performance requirement, determines whether the cycle length added by the adjustment value exceeds a preset maximum value, and if so, sets the cycle length as 0, and if not, adds the cycle length with the adjustment value.

15. The power management system of claim 14 wherein if the cycle length is not 0, the control unit further determines whether the cycle length reduced by the adjustment value is less than a preset minimum value, and if so, sets the cycle length as the preset minimum value, and if not, reduces the cycle length with the adjustment value.

16. The power management system of claim 10 wherein the control unit further compares the running cycle with the performance requirement, if the running cycle is less than the performance requirement, sets the cycle length according to a formula $Pg=INT((Pt-Pw)/Pw)+1$, where $Pg$ is the cycle length, $Pt$ is the performance requirement, and $Pw$ is the running cycle, and if the running cycle exceeds the performance requirement, sets the cycle length as 0.

17. The power management system of claim 16 wherein the control unit further determines whether the cycle length set according to the formula is less than a preset minimum value, and if so, sets the cycle length as the preset minimum value, and if not, sets the cycle length according to the formula.

18. The power management system of claim 10 wherein the counter records the running cycle according to a counter clock, where the counter clock and the working clock are independent and mutually non-interfering.

* * * * *